United States Patent [19]
Collina et al.

[11] Patent Number: 6,100,333
[45] Date of Patent: Aug. 8, 2000

[54] DYNAMICALLY VULCANIZABLE POLYOLEFIN COMPOSITIONS

[75] Inventors: Gianni Collina, Casalecchio de Reno; Emilio Martini, Sasso Marconi; Vittorio Braga; Franco Sartori, both of Ferrara, all of Italy

[73] Assignee: Montell Technology Company b.v., Netherlands

[21] Appl. No.: 08/647,020

[22] Filed: May 8, 1996

[30] Foreign Application Priority Data

May 11, 1995 [IT] Italy .................. MI95A0945

[51] Int. Cl.[7] .................... C08L 23/10; C08L 23/04; C08L 23/26
[52] U.S. Cl. .................... 525/191; 525/192; 525/211; 525/232; 525/240
[58] Field of Search .................... 525/191, 192, 525/211, 232, 240

[56] References Cited

U.S. PATENT DOCUMENTS

| | | | |
|---|---|---|---|
| Re. 32,028 | 11/1985 | Fischer | 525/194 |
| 4,298,718 | 11/1981 | Mayr et al. | |
| 4,495,338 | 1/1985 | Mayr et al. | |
| 4,521,566 | 6/1985 | Galli et al. | |
| 4,634,735 | 1/1987 | Thiersault et al. | 525/88 |
| 4,829,125 | 5/1989 | Yeo et al. | 525/194 |
| 4,963,612 | 10/1990 | Bragga et al. | |
| 5,126,408 | 6/1992 | Rifi | 525/240 |
| 5,177,147 | 1/1993 | Spenadel et al. | 525/88 |
| 5,286,564 | 2/1994 | Cecchin et al. | |
| 5,457,159 | 10/1995 | Fassina et al. | 525/133 |
| 5,648,422 | 7/1997 | Collina et al. | 525/52 |
| 5,763,534 | 6/1998 | Srinivasan et al. | 525/240 |

FOREIGN PATENT DOCUMENTS

| | | |
|---|---|---|
| 0 361 205 A2 | 4/1990 | European Pat. Off. . |
| 0 361 493 A1 | 4/1990 | European Pat. Off. . |
| 0 361 494 A2 | 4/1990 | European Pat. Off. . |
| 0 362 705 A2 | 4/1990 | European Pat. Off. . |
| 0 395 083 A2 | 10/1990 | European Pat. Off. . |
| 0 424 145 A2 | 4/1991 | European Pat. Off. . |
| 0 433 989 A2 | 6/1991 | European Pat. Off. . |
| 0 433 990 A2 | 6/1991 | European Pat. Off. . |
| 0 451 645 A2 | 10/1991 | European Pat. Off. . |
| 0 553 805 A1 | 8/1993 | European Pat. Off. . |
| 0 553 806 A1 | 8/1993 | European Pat. Off. . |
| 0 574 040 A1 | 12/1993 | European Pat. Off. . |
| 0 603 724 A2 | 6/1994 | European Pat. Off. . |
| 0 614 938 A1 | 9/1994 | European Pat. Off. . |
| 0 643 078 A2 | 3/1995 | European Pat. Off. . |
| WO 96/11218 | 4/1986 | WIPO . |

OTHER PUBLICATIONS

Chisso Corp., WPIDS AN 81–49725D, Jun. 1981.
Chiba et al., WPIDS AN 83–712471, Jun. 1983
Hattori et al., WPIDS AN 81–64496D, Jul. 1981.
J.C. Randall, "Polymer Sequence Determination Carbon–13 NMR Method", Academic Press, 1977, pp. 53–58.

*Primary Examiner*—Jeffrey C. Mullis
*Attorney, Agent, or Firm*—Bryan Cave LLP; Maurice B. Stiefel, Esq.

[57] ABSTRACT

The present invention relates to polyolefin compositions comprising: (a) 20 to 50 parts by weight of a particular propylene polymer having an MWD greater than 3.5; and (b) 50 to 80 parts by weight of an elastomeric ethylene copoymerR having a low enthalpy of fusion and a narrow MWD. The compositions of the invention are capable of gining, after dynamic vulcanization, thermoplastic elastomeric products having optimum elastomeric properties and a good balance of physico-mechanical properties

19 Claims, No Drawings

DYNAMICALLY VULCANIZABLE POLYOLEFIN COMPOSITIONS

The present invention relates to polyolefin compositions which are capable of giving, after dynamic vulcanization, thermoplastic elastomeric products having optimum elastomeric properties and a good balance of elasto-mechanical properties.

In particular, the present invention relates to polyolefin compositions comprising a crystalline polypropylene phase and a substantially amorphous phase having elastomeric properties.

As it is known, thermoplastic elastomers are materials which, unlike conventional elastomers, can be processed by means of apparatus usually associated with the use of thermoplastic resins. Such products are used in various sectors, in particular where articles are required which have a good combination of elastic properties and mechanical properties, such as, for example, in seal gaskets used in the automobile sector or in some types of electrical household appliances. In these applications, they replace conventional elastomers which require long processing work in three stages (mixing with additives, moulding and crosslinking). Moreover, the thermoplastic elastomeric products, unlike the conventional elastomers used in thermoforming processes, can be totally or partially recycled. Among the various thermoplastic elastomeric products, dynamically vulcanized compositions, comprising a crystalline or semicrystalline polypropylene phase and an amorphous phase constituted generally by an ethylene/$\alpha$-olefin/diene rubber, are those which are most suitable for the market demands, owing also to their favourable cost/performance balance. The said compositions are characterized by elastomeric properties which are still not satisfactory, because of both difficulties due to compatibility problems between the elastomeric phase and the crystalline phase and the presence of residual crystallinity in the elastomeric phase.

One of the methods proposed for improving the compatibility of the two phases consists in producing the said compositions directly in the reactor by means of sequential polymerization in a multi-stage process. In the first stage, the propylene-based crystalline copolymer is generally produced, while the second stage comprises the polymerization of ethylene/propylene mixtures in the presence of the product obtained in the first stage, in order to obtain elastomeric copolymers. Both stages of these processes are carried out in the presence of the same catalytic system which generally consists of a conventional catalyst of the Ziegler/Natta type comprising a titanium compound supported on a magnesium halide in active form. Compositions obtained by means of this type of process are described in U.S. Pat. No. 4,521,566 and U.S. Pat. No. 5,286,564. An analogous process is described in EP-A-433,989 and EP-A-433,990 in which an unsupported metallocene catalyst is used in both polymerization stages. The products obtained in these processes, however, do not have a suitable balance of physico-mechanical properties.

It has now been unexpectedly found that some polyolefin compositions, comprising a crystalline polypropylene phase and a substantially amorphous phase characterized by specific properties, are capable of giving, after dynamic vulcanization, thermoplastic elastomeric compositions having improved elastomeric properties and a better balance of elasto-mechanical properties.

A subject of the present invention is therefore a polyolefin composition comprising:

(A) 20 to 50 parts by weight of a crystalline propylene polymer having an isotacticity index greater than 80, selected from polypropylene homopolymer and propylene copolymers containing 0.5 to 15 mol % of ethylene and/or an $\alpha$-olefin having 4 to 10 carbon atoms, the said propylene polymer having a molecular weight distribution (MWD) greater than 3.5; and (B) 50 to 80 parts by weight of an elastomeric ethylene copolymer with olefins $CH_2=CHR$, in which R is alkyl having 1 to 10 carbon atoms, and, if appropriate, containing minor proportions of units derived from a polyene, the said copolymer containing 40 to 70% by weight of units derived from ethylene and 30 to 60% by weight of units derived from an $\alpha$-olefin, and having the following characteristics: (a) a molecular weight distribution lower than 3.5 and (b) a crystallinity content, expressed as the enthalpy of fusion, lower than 20 J/g.

Preferably, component (B) has a content of 2–1 regioinvertions of the $\alpha$-olefin units of lower than 5%.

The molecular weight distribution, the crystallinity content and the content of regioinvertions are determined by the methods described later.

Preferably, the compositions of the present invention comprise between 20 and 40 parts by weight of component (A) and between 60 and 80 parts by weight of component (B), more preferably between 30 and 40 parts of component (A) and between 60 and 70 parts of component (B).

The propylene polymer which constitutes component (A) preferably has an isotactic index, determined by measurement of the solubility in xylene, greater than 85 and more preferably greater than 90.

It is preferable for the propylene polymer which constitutes component (A) of the present invention to have an MWD greater than 5 and generally between 5 and 50.

The melt index (ASTM 1238 condition "L") of component (A) is generally between 0.1 and 50 g/10 minutes. The best results are obtained when the melt index of these polymers is between 0.1 and 30.

If component (A) of the invention consists of a propylene copolymer, particularly interesting results are obtained when copolymers containing from 2 to 10 mol % of an alpha-olefin other than propylene are used. Preferably, the alpha-olefin is selected from the group comprising ethylene, 1-butene, 1-hexene, 1-octene and 4-methyl-1-pentene. Among these, ethylene and 1-butene are particularly preferred.

Component (A) of the present invention can be prepared according to known technologies by polymerization of propylene, if appropriate in the presence of ethylene or other $\alpha$-olefins, in the presence of conventional catalysts of the Ziegler/Natta type comprising the product of the reaction between an aluminium alkyl and a solid component comprising a transition metal supported on $MgCl_2$ in an active form. In particular, the best results are obtained when using catalysts comprising the product of the reaction between:

(i) a solid component comprising a titanium compound without Ti-$\pi$ bonds and an electron donor compound (internal donor) supported on a magnesium halide in an active form;

(ii) an Al-alkyl compound and, if appropriate, an electron donor compound (external donor).

The use of an external electron donor compound is generally necessary to obtain propylene polymers having an isotacticity index greater than 80. Nevertheless, if compounds of the type described in Patent EP-A-361,493 are used as internal electron donor compounds, the stereospecificity of the catalyst is by itself sufficiently high and it is not necessary to use an external electron donor compound.

The magnesium halides, preferably MgCl$_2$, in an active form used as support for Ziegler-Natta catalysts are widely known from the patent literature. The U.S. Pat. Nos. 4,298, 718 and 4,495,338 described for the first time the use of these compounds in Ziegler-Natta catalysis. It is known from these patents that the magnesium halides used in the active form as support or co-support in catalyst components for the polymerization of olefins are characterized by X-ray spectra in which the most intense diffraction line appearing in the spectra of the inactive halide is reduced in intensity and replaced by a halo whose intensity maximum is displaced towards angles which are smaller with respect to that of the most intense line.

The titanium compound is preferably selected from the halides and halogeno-alcoholates.

Preferred titanium compounds are TiCl$_4$, TiCl$_3$ and the halogeno-alcoholates of the formula Ti(OR$^1$)$_m$X$_n$ in which R$^1$ is a hydrocarbon radical with 1–12 carbon atoms or a group COR$^1$, X is halogen and (m+n) is the valency of the titanium.

Advantageously, the catalytic component (i) is used in the form of spherical particles having an average diameter of between about 10 and 150 $\mu$m. Suitable methods for preparing the said components in a spherical form are described, for example, in the Patents EP-A-395,083, EP-A-553,805 and EP-A-553,806, the description of which, relating to the method of preparation and to the characteristics of the products, is incorporated herein by reference.

Suitable internal electron donor compounds include the ethers, esters and in particular the esters of polycarboxylic acids, the amines, the ketones and the 1,3-diethers of the type described in the Patents EP-A-361,493, EP-A-361,494, EP-A-362,705 and EP-A-451,645.

The Al-alkyl compound (ii) is preferably selected from the aluminium trialkyls, such as, for example, Al-triethyl, Al-triisobutyl, Al-tri-n-butyl, Al-tri-n-hexyl and Al-tri-n-octyl. Mixtures of Al-trialkyls with Al-alkyl halides, Al-alkyl hydrides or Al-alkyl sesquichlorides such as AlEt$_2$Cl and Al$_2$Et$_3$Cl$_3$ may also be used.

The external donor can be of the same type as or can differ from the internal donor. If the internal donor is the ester of a polycarboxylic acid, in particular a phthalate, the external donor is preferably selected from the silicon compounds of the formula R$_1$R$_2$Si(OR)$_2$, where R$_1$ and R$_2$ are alkyl, cycloalkyl or aryl radicals having 1–18 carbon atoms. Examples of such silanes are methyl-cyclohexyl-dimethoxy-silane, diphenyl-dimethoxy-silane, methyl-t-butyl-dimethoxy-silane and dicyclopentyl-dimethoxy-silane.

The elastomeric copolymer used as component (B) is preferably selected from the copolymers of ethylene with $\alpha$-olefins CH$_2$=CHR in which R is alkyl having 1 to 6 carbon atoms. More preferably, the $\alpha$-olefin is propylene or butene.

In said copolymer, the content by weight of units derived from ethylene is preferably between 50 and 70%, more preferably between 60 and 70%. The content by weight of units derived from $\alpha$-olefins is preferably between 30 and 50%, more preferably between 30 and 40%.

Particularly preferred moreover are the copolymers which contain 0.1 to 20% by weight, preferably 1 to 10%, of units derived from a polyene. Such a polyene can be selected from the group comprising trans-1,4-hexadiene, cis-1,4-hexadiene, 6-methyl-1,5-heptadiene, 3,7-dimethyl-1,6-octadiene and 11-methyl-1,10-dodecadiene; monocyclic diolefins such as, for example, cis-1,5-cyclooctadiene and 5-methyl-1,5-cyclooctadiene; bicyclic diolefins such as, for example, 4,5,8,9-tetrahydroindene and 6- and/or 7-methyl-4,5,8,9-tetrahydroindene; alkenyl- or alkylidene-norbornenes such as, for example, 5-ethylidene-2-norbornene, 5-isopropylidene-2-norbornene and exo-5-isopropenyl-2-norbornene; polycyclic diolefins such as, for example, dicyclopentadiene, tricyclo[6.2.1.0$^{2,7}$]4,9-undecadiene and the 4-methyl derivative thereof, 1,4-hexadiene, isoprene, 1,3-butadiene, 1,5-hexadiene, 1,6-heptadiene and so on. Among these, 5-ethylidene-2-norbornene is particularly preferred.

As already noted, the elastomeric copolymer used in the present invention is characterized by a low crystallinity. Preferably, the crystallinity, expressed as the enthalpy of fusion determined by DSC analysis, is lower than 10 J/g, more preferably lower than 5.

Preferably, the elastomeric copolymer used in the present invention has an MWD of lower than 3, generally of between 2 and 3.

Moreover, the said elastomeric copolymer preferably has a content of 2–1 regioinversions of the $\alpha$-olefin units of lower than 3%, more preferably lower than 1%.

The said copolymer can advantageously be prepared by polymerizing mixtures of ethylene, alpha-olefin and, if appropriate, polyene in the presence of a catalytic system comprising a metallocene compound and an alumoxane.

Some examples of metallocene compounds which can be used are rac-ethylidene-bis(4,5,6,7-tetrahydroindenyl) zirconium dichloride and meso-ethylidene-bis-(4,7-dimethylindenyl)zirconium dichloride.

Particularly suitable alumoxane compounds are methyl alumoxane (MAO) and tetraisobutyl alumoxane (TIBAO).

The polyolefin compositions according to the present invention can be obtained by using known methodologies such as mechanical mixing of the two components by means of internal mixers of the Banbury type, having a high homogenizing power. Alternatively, the said compositions can advantageously be obtained directly in the reactor by means of sequential polymerization. The compositions obtained according to this technique in fact show better elastomeric properties than those of the compositions obtained by simple mechanical mixing.

A further subject of the present invention is therefore a polyolefin composition obtained by means of sequential polymerization, comprising:

(A) 20 to 50 parts by weight of a crystalline propylene polymer having an isotacticity index greater than 80, selected from polypropylene homopolymer and propylene copolymers containing 0.5 to 15 mol-% of ethylene and/or an $\alpha$-olefin having 4 to 10 carbon atoms, the said propylene polymer having a molecular weight distribution (MWD) greater than 3.5; and (B) 50 to 80 parts by weight of an elastomeric ethylene copolymer with olefins CH$_2$=CHR, in which R is alkyl having 1 to 10 carbon atoms, and, if appropriate, containing minor proportions of units derived from a polyene, the said copolymer containing 40 to 70% by weight of units derived from ethylene and 30 to 60% by weight of units derived from an $\alpha$-olefin, and having the following characteristics: (a) an MWD lower than 3.5 and (b) a crystallinity content, expressed as the enthalpy of fusion, lower than 20 J/g.

Preferably, the said compositions comprise between 20 and 40 parts by weight of component (A) and between 60 and 80 parts by weight of component (B), more preferably between 30 and 40 parts of component (A) and between 60 and 70 parts of component (B).

The propylene polymer constituting component (A) preferably has an isotactic index, determined by means of measuring the solubility in xylene, greater than 85, more preferably greater than 90, and an MWD greater than 5, generally between 5 and 50.

Component (B) is preferably selected from the copolymers of ethylene with α-olefins $CH_2=CHR$ in which R is alkyl having 1 to 3 carbon atoms, more preferably containing 0.1 to 20% by weight, preferably 1 to 10%, of units derived from one of the polyenes cited. The content by weight of units derived from ethylene is preferably between 50 and 70%, more preferably between 60 and 70%. The content by weight of units derived from the α-olefin is preferably between 30 and 50%, more preferably between 30 and 40%.

Also as stated above, the crystallinity of the said copolymer, expressed as the enthalpy of fusion determined by DSC analysis, is preferably lower than 10 J/g, more preferably lower than 5. Moreover, the elastomeric copolymer shows an MWD which is preferably lower than 3, generally between 2 and 3.

The abovementioned compositions are preferably prepared by the process described in the Patent Application MI94A-002,028. The said process comprises a first stage in which, in the presence of a catalyst having a spherical morphology and containing a titanium compound supported on $MgCl_2$ in an active form, the olefin polymer constituting component (A) of the present invention is prepared by polymerization of propylene, if appropriate in a mixture with other alpha-olefins. In the second stage of the process, the product obtained in the first stage is:

(a) contacted with a compound capable of deactivating the catalyst present; and (b) contacted with a catalyst comprising a compound of a transition metal M selected from Ti, V, Zr and Hf, containing at least one M-π bond.

Finally, in the third stage, in the presence of the product obtained in the second stage, a mixture of ethylene, alpha-olefin and, if appropriate, a polyene is polymerized to obtain component (B) of the present invention, which is thus obtained dispersed in the crystalline matrix prepared in the first stage.

In addition to the properties illustrated above, the compositions obtained by this process also have optimum morphological properties which evidently result from the spherical or spheroidal form of the polymer particles.

The compositions which are the subject of the present invention are subjected to vulcanization or crosslinking in order to produce thermoplastic elastomeric compositions for use in the application sectors cited above.

The terms vulcanization and crosslinking comprise both the actual crosslinking or vulcanization of the elastomer and the reaction by means of which the grafting of the more or less crosslinked elastomer on the crystalline polypropylene phase can take place as a result of the reaction promoted by the crosslinking system used.

Among the various vulcanization techniques known in the art, the preferred technique is dynamic vulcanization. When working according to this technique, the compositions of the invention are subjected to kneading or to other shear forces in the presence of crosslinking agents and, if appropriate, coadjuvants thereof, at temperatures between 140 and 240° C., preferably at temperatures higher than the melting point of the crystalline phase. The compositions of the invention can be impregnated with an oil extender for regulating their hardness, either before the addition of the crosslinking agent or at the start or end of vulcanization. The oil extender used can be of various types, for example aromatic, naphthenic or preferably paraffinic. It is used in quantities such that weight ratios between the oil extender and component B of between 1:5 and 5:1, preferably between 1:2 and 2:1, are obtained.

The crosslinking agents which can be used are those commonly known in the art, such as organic peroxides, preferably having a half-life of the order of 10–200 seconds in the temperature range in which crosslinking normally takes place, and non-peroxidic agents such as the derivatives of 1,2-diphenylmethane, 1,2-diphenylethane and benzopinacol. A particularly suitable group of non-peroxidic agents consists of the furan derivatives described in EP 361,205, among which difurfuralaldazine and 1,5-difurfuryl-1,4-pentadien-3-one prove to be preferable.

As coadjuvant compounds for the crosslinking, liquid 1,2-polybutadiene or compounds of the triallyl cyanurate type can be used.

Before they are subjected to dynamic vulcanization, the compositions of the invention can be provided with various additives, such as heat stabilizers, antioxidants, mineral fillers or any other type of agents customarily used in the art.

A further subject of the invention is therefore vulcanized thermoplastic compositions obtained by the vulcanization processes described above, as manufactured, as well as moulded articles obtainable from the said compositions.

As can be seen from the tests reported in Table 2, the vulcanized compositions of the present invention show improved elastic properties over those of the previously known compositions. This becomes evident from a comparison of the said compositions with known compositions having either similar crystallinity values or similar values of ethylene content in component (B). Both the compositions obtained directly in a reactor and those obtained by mechanical blending show tension-set and compression-set values better than those of the known art, while maintaining at the same time a good balance of elasto-mechanical properties. In particular, the dynamically vulcanized compositions show values of ultimate tensile stress greater than 5 MPa, tension-set values at 100° C. which are always lower than 20%, and compression-set free values always lower than 45% and, in the best cases, lower than 35%. Moreover, the behaviour of the compositions of the present invention when impregnated with the oil extender is particularly interesting. The tendency of compounds of low molecular weight to exude (blooming) is considerably lower than that of the compositions of the prior art.

The following examples are given for illustrative purposes and do not limit the invention itself.

The indicated properties are determined by the following methods:

Melt flow index: ASTM-D 1238, condition "L"

Fraction soluble in xylene: determined at 25° C. by the following procedures:

About 2.5 g of copolymer and 250 ml of xylene are placed in a flask provided with a cooler and reflux condenser, under a blanket of $N_2$. The flask is heated to 131° C. and continuously stirred for about 60 minutes. It is allowed to cool with stirring down to 25° C., the contents are filtered and, after evaporation of the solvent of the filtrate down to dryness at constant weight, the weight of the soluble material is obtained.

Comonomer content: percent by weight of comonomer determined via the I.R. spectrum.

Effective density: ASTM-D 792

Intrinsic viscosity: ASTM 2857–70

The measurements by differential scanning calorimetry (DSC) were carried out on an instrument DSC-7 from Perkin Elmer Co. Ltd., according to the following procedure. About 10 mg of sample are heated to 180° C. at a scanning rate equal to 10° C./minute; the sample is held at 180° C. for 5 minutes and then cooled at a scanning rate equal to 10° C./minute. A second scan is then carried out under the same conditions as the first. The values reported are those obtained in the first scan.

Determination of the MWD: determined by GPC on a Waters instrument 150 in orthodichlorobenzene at 150° C.

Determination of the regioinversions: determined by means of $C^{13}$—NMR according to the methodology described by J. C. Randall in "Polymer sequence determination Carbon 13 NMR method", Academic Press 1977. The content of regioinversions is calculated on the basis of the relative concentration of $S_{\alpha\beta}+S_{\beta\beta}$ methylene sequences.

Compression set 100° C.: ASTM D395, method B

Compression set free: the procedure is the same as for the compression set at 100° C., with the difference that, before the measurement, the sample is placed in an oven for 30 minutes at 100° C.

Tension set 100° C.: ASTM D412, using a sample according to ASTM 1329.

Tension set 23° C.: ASTM D412, using a sample according to ASTM 1329.

Elongation at break: ASTM D412, using a microspecimen.

Ultimate tensile strength: ASTM D412, using a microspecimen.

Shore A hardness: ASTM D2240.

EXAMPLE 1

Preparation of an Elastomeric Composition Directly in the Reactor (Composition 1)

Preparation of Component A (Stage 1)

0.00307 g of a solid catalytic component, prepared according to Example No. 3 of Patent EP-A-395,083, were precontacted in a 50 ml glass flask with 0.0856 g of triethylaluminium (TEAL) and 0.01713 g of dicyclopentyl-dimethoxysilane (DCPMS) in 8 ml of anhydrous hexane. The mixture was fed to a 4.25 l steel autoclave, previously purged by successive washings first with hexane for one hour at 80° C. and then with gaseous propylene for one hour at 80° C. 1700 g of liquid propylene together with 4500 ml of hydrogen were then fed at 30° C. The temperature was taken to 70° C. and a polymerization took place for 150 minutes to give 50 g of polypropylene having the following properties: IV=1.59 dl/g; insoluble in xylene=96.2% by weight.

Intermediate Treatment (Stage 2)

After degassing the propylene from stage 1, 1000 ml of hexane humidified with 0.0107 g of $H_2O$ are fed into the same reactor, to the polymer produced in stage 1. The hexane was left in contact with the polymer for 30 minutes at 50° C. in a nitrogen atmosphere. The liquid was siphoned out of the reactor, and several purges with vacuum/nitrogen cycles were carried out at ambient temperature. 500 g of liquid propane at a temperature of 50° C. and a pressure of 19.5 bar were then charged to the same reactor. 0.008 g of rac-EBTHIZrCl$_2$, precontacted in cyclohexane with 1.87 mmol of TIBAO for 10 minutes at 25° C., were then fed in. The polymer was left in contact with this mixture for 10 minutes at 40° C. The propane was removed by evaporation at 40° C., and several purges with gaseous propylene were then carried out at 40° C. in order to eliminate the residual propane.

Preparation of Component B (Stage 3)

In the same reactor at 40° C., 47.2 g of ethylene and 60.5 g of propylene were fed to the polymer treated in stage 2. The composition of the copolymer was kept constant by feeding a mixture of the two monomers with 70% by weight of ethylene. Copolymerization was carried out for 5 hours at 40° C. and 15.5 bar. This gave 149 g of a copolymer whose properties are shown in Table 1.

EXAMPLE 2

Preparation of an Elastomeric Composition Directly in the Reactor (Composition 2)

Preparation of Component A (Stage 1)

0.00916 g of a solid catalytic component, prepared according to Example No. 3 of Patent EP-A-395,083, were precontacted in a 50 ml glass flask with 0.0856 g of triethylaluminium (TEAL) and 0.01713 g of dicyclopentyl-dimethoxysilane (DCPMS) in 8 ml of anhydrous hexane.

Following the procedure described in Example 1, except that 982 ml of hydrogen were used and the polymerization was carried out for 1 hour, 49.5 g of polypropylene were obtained, having the following properties: IV=2.01 dl/g; insoluble in xylene=96.1% by weight.

Intermediate Treatment (Stage 2)

The procedure described in Example 1 is repeated, but using 0.001 g of meso-EBDMIZrCl$_2$, precontacted in cyclohexane for 10 minutes at 25° C. with 0.4214 mmol of MMAO.

Preparation of Component B (Stage 3)

In the same reactor at 40° C., 27.4 g of ethylene and 70.4 g of propylene were fed to the polymer treated in stage 2. The composition of the copolymer was kept constant by feeding a mixture of the two monomers with 70% by weight of ethylene. Copolymerization was carried out for 64 minutes at 40° C. and 13 bar. This gave 161.5 g of a copolymer whose properties are shown in Table 1.

EXAMPLE 3

37.3 g of the composition obtained in Example 1 were impregnated with 24.7 g of Flexon 876 paraffin oil in such a way that a final mixture having a weight ratio between component B and oil equal to 1:1 was obtained. This mixture (62 g) was introduced into an internal mixer of the Banbury type (volume 60 ml) at a temperature of 180° C., at 60 r.p.m. together with 1.235 g of a master batch with 80% by weight of ZnO, 0.988 g of Lithene PH (liquid polybutadiene), 0.136 g of di-furfuralaldazine and 0.124 g of Chimassorb 944 and mixed for 2 minutes. Then, 0.988 g of Trigonox 101/40 MD GR were introduced and the mixture was mixed for a further 6 minutes for the dynamic crosslinking of the product. 30 g of mixture were moulded in a plate press for 5 minutes at 200° C. and then cooled in a second press maintained for 10 minutes at 23° C. After conditioning at ambient temperature for 48 hours, the plates obtained (120×120×2 mm) were characterized by the following analytic techniques: tension set, compression set, ultimate stress and elongation at break, Shore A hardness. The results of the characterization are shown in Table 2.

EXAMPLE 4

36.6 g of the composition obtained in Example 2 were impregnated with 25.4 g of Flexon 876 paraffin oil in such a way that a final mixture having a weight ratio between component B and oil equal to 1:1 was obtained. This mixture (62 g) was introduced into an internal mixer of the Banbury type (volume 60 ml) at a temperature of 180° C., at 60 r.p.m. together with 1.27 g of a masterbatch with 80% by weight of ZnO, 1.02 g of Lithene PH (liquid polybutadiene), 0.140 g of di-furfuralaldazine and 0.127 g of Chimassorb 944 and mixed for 2 minutes. Then, 1.02 g of Trigonox 101/40 MD GR were introduced and the mixture was mixed for a further 6 minutes for the dynamic crosslinking of the product. The moulding and the characterization took place as in Example 3. The results of the characterization are given in Table 2.

EXAMPLE 5

32.6 g of a composition obtained according to the procedure of Example 2 were impregnated with 29.4 g of Flexon 876 paraffin oil in such a way that a final mixture having a weight ratio between component B and oil equal to 1:1.3 was obtained. This mixture (62 g) was introduced into an internal mixer of the Banbury type (volume 60 ml) at a temperature of 180° C., at 60 r.p.m. together with 1.22 g of a masterbatch of 80% by weight of ZnO, 0.976 g of Lithene PH (liquid polybutadiene), 0.134 g of di-furfuralaldazine and 0.125 g of Chimassorb 944 and mixed for 2 minutes. Then, 0.976 g of Triganox 101/40 MD GR were introduced and the mixture was mixed for a further 6 minutes for the dynamic crosslinking of the product. The moulding and the characterization took place as in Example 3. The results of the characterization are given in Table 2.

EXAMPLE 6

39.8 g of an elastomeric $C_2/C_3$ copolymer containing 67.5% by weight of $C_2$ and having an I.V.=2.9 were mixed in an internal mixer of the Banbury type (volume 60 ml) at a temperature of 195° C., at 60 r.p.m. for 4 minutes together with 20.2 g of polypropylene produced in stage 1 of Example 1 in the presence of 0.12 g of Irganox 1010 as processing stabilizer. 37.3 g of this mixture (composition 3) were impregnated with 24.7 g of Flexon 876 paraffin oil in such a way that a final mixture having a weight ratio between component B and oil equal to 1:1 was obtained. This mixture (62 g) was introduced into an internal mixer of the Banbury type (volume 60 ml) at a temperature of 180° C., at 60 r.p.m. together with 1.235 g of a master batch of 80% by weight of ZnO, 0.988 g of Lithene PH (liquid polybutadiene), 0.136 g of di-furfuralaldazine and 0.124 g of Chimassorb 944, and mixed for 2 minutes. Then, 0.988 g of Trigonox 101/40 MD GR were introduced and the mixture was mixed for a further 6 minutes for the dynamic crosslinking of the product. The moulding and the characterization took place as in Example 3. The results of the characterization are given in Table 2.

EXAMPLE 7 (COMPARISON)

The procedure of Example 3 is repeated using, in place of composition 1, 37.5 g of composition 4 which was obtained directly in the reactor and in which the component B is characterized by an ethylene content of 26% and an MWD of 10 and a crystallinity of 10 J/g (Table 1). The composition is processed as in Example 3, using 24.5 g of oil, 0.994 g of Lithene PH, 0.137 g of di-furfuralaldazina, 0.124 g of Chimassorb and 0.944 g of Trigonox. The results of the characterization are given in Table 2.

EXAMPLE 8 (COMPARISON)

The procedure of Example 3 is repeated using, in place of composition 1, 38.75 g of composition 5 which was obtained directly in the reactor and in which the component B is characterized by an ethylene content of 65%, an MWD of 8 and a crystallinity of 35 J/g (Table 1). The composition is processed as in Example 3, using 23.25 g of oil, 1.163 g of ZnO, 0.93 g of Lithene PH, 0.128 g of di-furfuralaldazina, 0.116 g of Chimassorb and 0.93 g of Trigonox. The results of the characterization are given in Table 2.

TABLE 1

|  | Composition 1 | Composition 2 | Composition 3 | Composition 4 | Composition 5 |
|---|---|---|---|---|---|
| Component A |  |  |  |  |  |
| (% by weight) | 33.6 | 30.7 | 33.6 | 33 | 35 |
| (% by wt. of α-olefin) | homopolymer | homopolymer | homopolymer | 3.2 | homopolymer |
| (intrinsic viscosity) | 1.59 | 2.1 | 1.59 | 1.4 | 1.65 |
| Component B |  |  |  |  |  |
| (% by weight) | 66.4 | 69.3 | 66.4 | 67 | 65 |
| (% by weight of $C_2$) | 67.8 | 68.6 | 67.5 | 29 | 65 |
| (MWD) | 2.7 | 2.9 | 2.3 | 10 | 8 |
| ΔHf (J/g) | 15 | 6 | 12 | 10 | 35 |
| % soluble in xylene (% on A + B) | 68.8 | 68 | 67 | 63 | 50 |

TABLE 2

|  | Example 3 | Example 4 | Example 5 | Example 6 | Example 7 (comparison) | Example 8 (comparison) |
|---|---|---|---|---|---|---|
| Ultimate tens. strength (MPa) | 6.4 | 5.7 | 5.2 | 6.9 | 4.7 | 3.35 |
| Elongation at break (%) | 620 | 610 | 745 | 700 | 800 | 230 |
| Tension set at 23° C. (%) | 10 | 10 | 10 | 15 | 18 | 18 |
| Tension set at 100° C. (%) | 16 | 16 | 15 | 18 | 44 | 36 |
| Compression set at 100° C. (%) | 57 | 48 | 48 | 66 | 66 | 63 |
| Compression set free (%) | 34 | 33 | 28 | 44 | 48 | 50 |
| Hardness | 58 | 65 | 60 | 62 | 56 | 65 |
| Blooming | low | low | low | low | high | high |

What is claimed is:

1. A polyolefin composition comprising:
   (A) between 30 and 40 parts by weight of a crystalline propylene polymer having an isotacticity index greater than 80, selected from polypropylene homopolymer and propylene copolymers containing 0.5 to 15 mol % of ethylene and/or an α-olefin having 4 to 10 carbon atoms, the propylene polymer having a molecular weight distribution (MWD) greater than 3.5; and (B) between 70 and 80 parts by weight of an elastomeric ethylene copolymer with olefins $CH_2=CHR$, in which R is an alkyl group having 1 to 10 carbon atoms, and, optionally, containing minor proportions of units derived from a polyene, the copolymer containing 40 to 70% by weight of units derived from ethylene and 30 to 60% by weight of units derived from the α-olefin, and having the following characteristics: (a) a molecular weight distribution lower than 3.5, (b) a crystallinity content, expressed as the enthalpy of fusion, lower than 30 J/g, and (c) a content of 2–1 regioinvertions of the α-olefin units of lower than 5%.

2. Composition according to claim 1, characterized in that component (A) has an isotacticity index greater than 90.

3. Composition according to claim 1, characterized in that component (A) has an MWD of between 5 and 50.

4. Composition according to claim 1, characterized in that component (A) is selected from the propylene copolymers containing between 2 and 10% of an alpha-olefin other than propylene itself.

5. Composition according to claim 4, characterized in that the alpha-olefin is ethylene or 1-butene.

6. Composition according to claim 1, characterized in that, in component (B), the content by weight of units derived from ethylene is between 60 and 70%.

7. Composition according to claim 1, characterized in that component (B) is selected from the copolymers of ethylene with propylene or butene.

8. Composition according to claim 1, characterized in that component (B) is selected from copolymers which contain 0.1 to 10% by weight of units derived from a polyene.

9. Composition according to claim 8, characterized in that the polyene is selected from 5-ethylidene-2-norbornene or 1,4-hexadiene.

10. Composition according to claim 1, characterized in that component (B) has an MWD of between 2 and 3.

11. Composition according to claim 1, characterized in that the crystallinity of component (B) is lower than 10 J/g.

12. Composition according to claim 1, characterized in that the content of regioinvertions is lower than 1%.

13. Polyolefin composition according to claim 1, obtained by means of sequential polymerization.

14. Composition according to claim 13 in the form of spherical or spheroidal particles.

15. Process for the preparation of vulcanized thermoplastic elastomeric compositions, which comprises subjecting a composition according to claim 1 to kneading or other shear forces in the presence of crosslinking agents and, if appropriate, coadjuvants thereof, at temperatures of between 140 and 240° C.

16. Process according to claim 15, characterized in that the said composition is impregnated with an oil extender in such a quantity that the weight ratio between the oil extender and component (B) is between 1:5 and 5:1.

17. Vulcanized thermoplastic elastomeric compositions obtainable by the process according to claim 15.

18. Manufactured products obtained from compositions according to claim 17.

19. Moulded articles obtained from compositions according to claim 17.

* * * * *

UNITED STATES PATENT AND TRADEMARK OFFICE
CERTIFICATE OF CORRECTION

PATENT NO. : 6,100,333
DATED : August 8, 2000
INVENTOR(S): Gianni Collina, Casalecchio de Reno;
Emilio Martini, Sasso Marconi;
Vittorio Braga; Franco Sartori, both of Ferrara, all of Italy It is certified that error appears in the above-identified patent and that said Letters Patent are hereby corrected as shown below:

On the title page:
In the abstract, line 5, change "copoymerR" to --copolymer--

In the abstract, line 7, change "giving" to --giving--

Signed and Sealed this

First Day of May, 2001

Attest:

NICHOLAS P. GODICI

Attesting Officer     Acting Director of the United States Patent and Trademark Office